United States Patent [19]

Cooney

[11] Patent Number: 4,888,802
[45] Date of Patent: Dec. 19, 1989

[54] SYSTEM AND METHOD FOR PROVIDING FOR SECURE ENCRYPTOR KEY MANAGEMENT

[75] Inventor: Henry G. Cooney, Kettering, Ohio
[73] Assignee: NCR Corporation, Dayton, Ohio
[21] Appl. No.: 208,326
[22] Filed: Jun. 17, 1988
[51] Int. Cl.[4] .......................... H04L 9/02; H04R 1/00
[52] U.S. Cl. .......................................... 380/49; 380/4; 380/21; 380/23; 380/24; 380/25; 380/44
[58] Field of Search ................... 380/4, 21, 44, 49, 23, 380/24, 25

[56] References Cited

U.S. PATENT DOCUMENTS

| | | |
|---|---|---|
| 4,004,089 | 1/1977 | Richard et al. . |
| 4,123,747 | 10/1978 | Lancto et al. ........................ 235/380 |
| 4,465,901 | 8/1984 | Best . |
| 4,670,857 | 6/1987 | Rackman ............................... 380/4 |
| 4,787,027 | 11/1988 | Prugh et al. ........................... 380/24 |
| 4,797,928 | 1/1989 | Dykes .................................... 380/49 |

OTHER PUBLICATIONS

U.S. application Ser. No. 778,578, filed Sep. 20, 1985, entitled: "System Using an Adapter Board to Couple a Personal Computer to a Plurality of Peripherals in a Financial Environment", (as amended).

Primary Examiner—Stephen C. Buczinski
Attorney, Agent, or Firm—Wilbert Hawk, Jr.; Albert L. Sessler, Jr.; Elmer Wargo

[57] ABSTRACT

A system and method for storing encrypter keys in a secure manner to prevent a "debugger" or an unauthorized user of a user application from compromising the keys. A static RAM with a battery support is used to store the keys after they are installed therein by a processor included in the system. As used, the RAM because a write only RAM as far as the processor is concerned. Anytime a clear text key appears on a bus connecting the RAM with an enciphering chip used in the system, an interface between the bus and the processor is used to uncouple the bus from the processor. The system can also be used for "key encrypting key schemes".

7 Claims, 9 Drawing Sheets

| SRAM 60 | |
|---|---|
| AREAS | KEY NUMBER (HEX) |
| 60-3 — I.V.'S OR GENERAL PURPOSE AREA | 3FF<br>080 HEX |
| 60-2 — WORKING KEYS | 07F<br>020 HEX |
| 60-1 — MASTER KEY | 01F<br>000 HEX |

FIG. 7

|  | A2 | A1 |  |
|---|---|---|---|
| INPUT REGISTER 90 | 0 | 0 | RD/WR |
| COMMAMD REGISTER 76 | 0 | 1 | WR |
| COMMAND STATUS 78 | 0 | 1 | RD |
| MODE REGISTER 72 | 1 | 1 | WR |
| MODE STATUS 74 | 1 | 1 | RD |
| NOT USED | 1 | 0 |  |

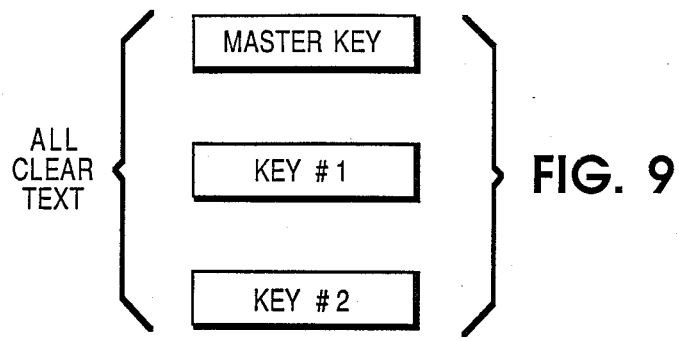
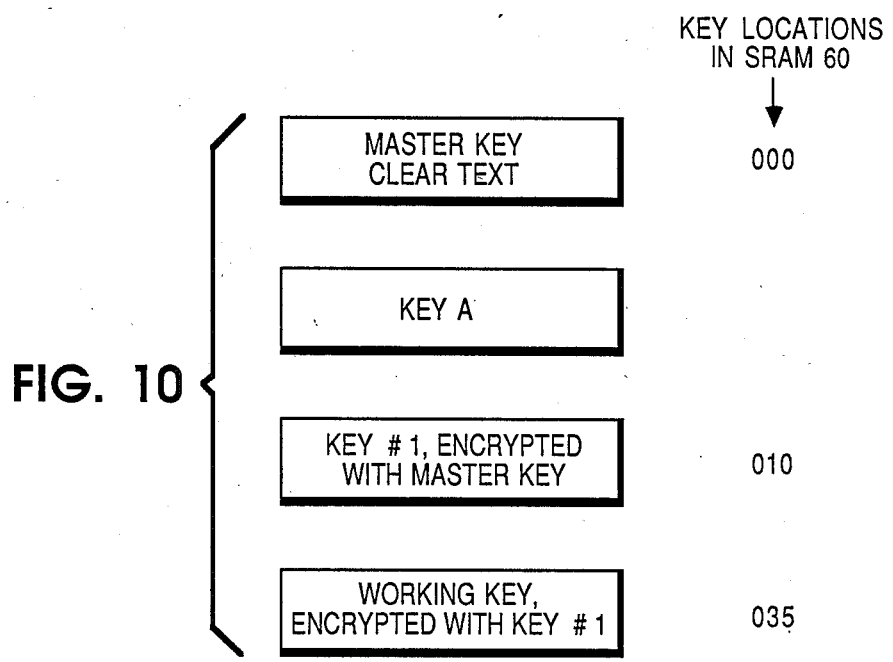

SYSTEM AND METHOD FOR PROVIDING FOR SECURE ENCRYPTOR KEY MANAGEMENT

BACKGROUND OF THE INVENTION

This invention relates generally to a system and a method for storing encrypter keys (clear text or encrypted) in such a manner as to prevent a "debugger" or an unauthorized user of a user application from compromising the keys.

A standard encrypter chip such as AMD 9568, for example, may be used in a teller terminal, for example, which is used in the financial industry. The encrypter chip may be used in the transmission of personal or financial data associated with the use of teller terminals, for example.

One of the problems associated with the use of the encrypter chip in financial machines, for example, was that it was difficult to keep the encrypter keys associated with the chip in a secure manner. An unauthorized "debugger" or an unauthorized user of the application software associated with the terminal was able to compromise the keys.

SUMMARY OF THE INVENTION

An object of the invention is to provide a system and a method for keeping encryption keys secure once they have been installed in the system.

Another object of the invention is to provide a system and a method of obtaining different levels of security with regard to the use of encryption keys.

In a first aspect of the invention, there is provided a system for providing secure data comprising: a host terminal including a processor for executing instructions; an encryption module for encrypting/decrypting data; and a first bus for coupling said encryption module with said host terminal; said encryption module comprising: a data ciphering chip for encrypting/decrypting data; storing means for storing at least a key therein; a second bus for coupling said storing means with said data ciphering chip for transferring said key to said ciphering chip for use thereby; interface means for coupling said second bus with said first bus; said processor being effective to install said key in said storing means; and said interface means having means for uncoupling said second bus from said first bus with regard to accessing said key whenever said key is to appear on said second bus after being installed in said storing means by said processor.

In another aspect of the invention, there is provided a method of keeping encryption keys secure for use with an enciphering chip, said method comprising the steps of:

(a) providing a storing means for storing at least one key to be used in conjunction with said enciphering chip;

(b) utilizing an instruction from a processor to write said key into a predetermined area of said storing means;

(c) providing a first bus for coupling the storing means with the enciphering chip;

(d) providing a system interface between said first bus and said processor;

(e) utilizing an instruction from said processor to transfer said key from said predetermined area of said storing means to said enciphering chip;

(f) utilizing said system interface to lock said bus from said processor with regard to accessing said key after step b has occurred.

In yet another aspect of the invention, there is provided a method of keeping encryption keys secure for use with a processor and an enciphering chip when using key encrypting key schemes; said key encrypting key schemes comprising at least a clear text master key, an encrypted intermediate key, and an encrypted working key which are related to one another; said method comprising the steps of:

(a) providing a storing means having a first area for storing said clear text master key and also having a second area for storing said encrypted intermediate and working keys;

(b) providing a first bus for coupling said storing means with said enciphering chip;

(c) providing a system interface between said first bus and said processor;

(d) transferring said clear text master key from said first area over said first bus to said enciphering chip with instructions to decrypt data;

(e) transferring said encrypted intermediate key to be used to said encryption chip for decryption by said enciphering chip; said encrypted intermediate key being previously encrypted by said clear text key master key;

(f) decrypting said encrypted intermediate key from step e to generate a clear text intermediate key;

(g) transferring said clear text intermediate key from step f over said first bus to said first area of said storing means;

(h) transferring said clear text intermediate key from said first area of said storing means over said first bus to a master key register of said enciphering chip;

(i) installing said encrypted working key in at least one of the encrypt and decrypt registers of said enciphering chip;

(j) utilizing said encrypted working key installed in step i for encryption/decryption operations by said processor; and (k) utilizing said system interface to uncouple said first bus from said processor whenever a clear text key appears on said first bus.

BRIEF DESCRIPTION OF THE DRAWING

FIG. 7 is a chart showing various selection conditions associated with the enciphering chip shown in FIG. 2B;

FIG. 9 shows certain keys associated with "key encrypting key schemes";

FIG. 10 shows the relationship of certain keys associated with "key encrypting key schemes"

DETAILED DESCRIPTION OF THE INVENTION

Figure 1:
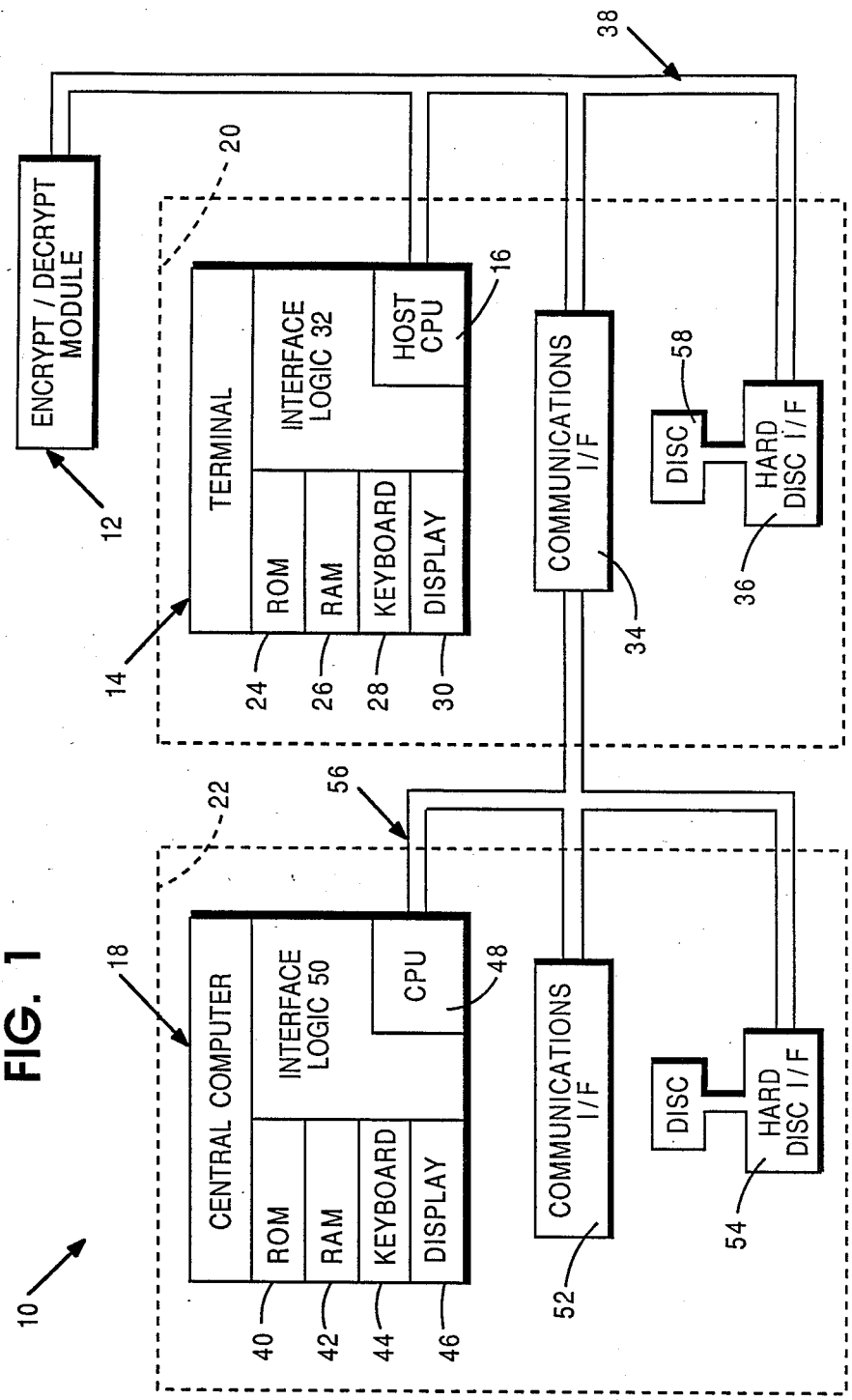
FIG. 1 is a general schematic view of a preferred embodiment of a system made according to this invention, showing an encryption/decryption module included therein.

FIG. 1 is a schematic diagram showing a system 10 made according to this invention. The system 10 includes an encryption/decryption module (E/D module) 12 and an associated terminal 14, including a host CPU 16. The system 10 may also include a central computer 18, although the central computer 18 is not necessary for the system 10.

As stated earlier herein, the terminal 14 may be a financial terminal in which secure data must be stored or processed, for example. The secure data may be financial balances or personal loan data, for example, when the system is used in a financial environment. The terminal 14 includes those components which are within the dashed rectangle 20, and correspondingly, the central computer 18 includes those components which are within the dashed rectangle 22.

The terminal 14 includes a ROM 24, RAM 26, keyboard (KB) 28, display 30, the host CPU 16, and interface logic 32 to enable the terminal to function conventionally. The terminal 14 also has a communications interface (I/F) 34 and a hard disc interface (I/F) 36 which are coupled to a main bus 38. The main bus 38 is also coupled to the host CPU 16 and the E/D module 12. Software or programs for controlling the operation of the terminal 14 may be stored in the ROM 24 or RAM 26 as is conventionally done.

The central computer 18 includes a ROM 40, RAM 42, keyboard (KB) 44, display 46, a CPU 48, and interface logic 50 to enable the central computer 18 to function conventionally. The central computer 18 also has a communications interface (I/F) 52 and a hard disc interface (I/F) 54 which are coupled to the CPU 48 and the communications interface 34 by a bus 56. Software or programs for controlling the operation of the central computer 18 may be stored in the ROM 40 or RAM 42 as is conventionally done.

As a typical illustration of the use of the E/D module 12, the terminal 14 may be required to update some of the totals which are located on a disc 58 associated with the terminal 14. If these totals are stored on the disc 58 in encrypted form, the terminal 14 will access the totals and forward them to the E/D module 12 where they are decoded and returned to the terminal 14. After the terminal 14 is finished with processing the totals, the software or application program associated with the terminal 14 may require that the revised totals be encrypted prior to returning them to the disc 58. In this situation, the terminal 14 sends the revised totals to the E/D module 12 for encryption prior to being stored on the disc 58.

As alluded to earlier herein, the particular encrypter key or keys used in the E/D module 12 may be loaded daily by a manager or officer of the institution in which the terminal 14 is located. There may be more than one such terminal 14 included in the system 10; however, only one is shown to simplify the drawing. If the encryption key or keys remain in the terminal 14 after they are installed by prior art methods, it is possible that an unlawful user of the system may attempt to obtain the keys through various "debugging" routines as previously mentioned. If the manager has to install the encryption keys every day as part of a start up routine, it means that the keys must be stored outside the system 10 where they could also be compromised.

In contrast with the methods discussed in the previous paragraph, once the encryption keys are installed in the E/D module 12, they are no longer accessible to the terminal 14, and consequently, they cannot be obtained through various debugging routines.

Figure 2A:
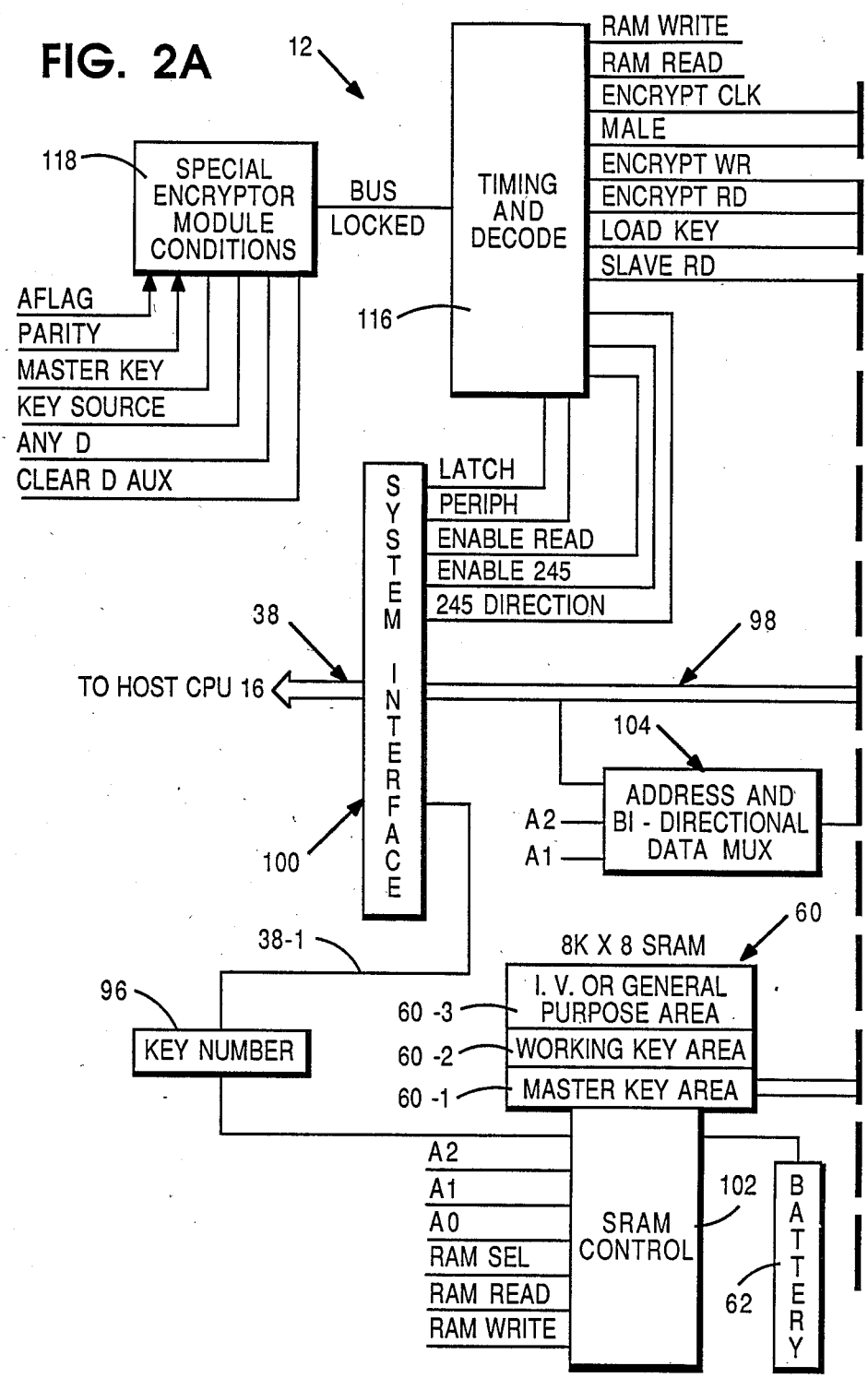
FIGS. 2A and 2B, taken together, show details of the encryption/decryption module shown in FIG. 1.
Figure 2B:
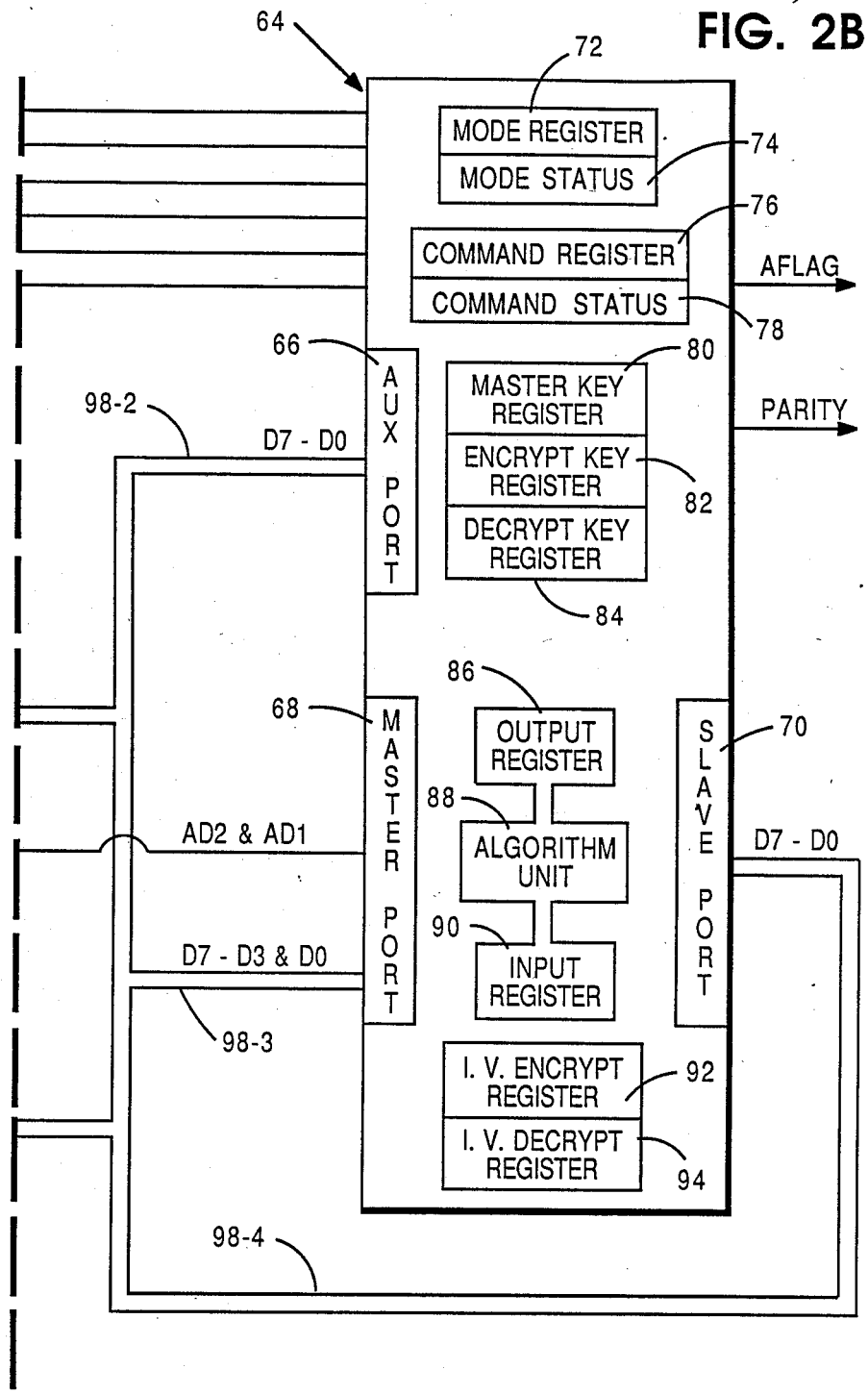

The E/D module 12, alluded to with regard to a discussion of FIG. 1, is shown in more detail in FIGS. 2A and 2B. One of the features of this invention is that the encryption keys are stored in a Static RAM or SRAM 60 which is supported by battery 62. After the encryption keys are written into the SRAM 60, the encryption keys are retained in the SRAM from day to day or after power failures, for example. While a SRAM 60 is normally a read/write device, the SRAM 60, as used in the E/D module 12, is in reality, a write only RAM as far as the host CPU 16 is concerned. This means that any debugging software being run by the host CPU 16 or any unauthorized use of software being run on the host CPU 16 can never see the data coming from the SRAM 16. To repeat, once the encryption keys have been installed in the SRAM 60, the SRAM 60 becomes a write only RAM as far as the host CPU 16 is concerned.

Continuing with a general description of the E/D module 12 shown in FIGS. 2A and 2B, the particular ciphering chip (designated generally as 64) selected for use with this invention is AMD 9568 which is manufactured by Advanced Micro Devices, for example. The ciphering chip 64 is commercially available, and it performs the National Bureau of Standards - Data Encryption Scheme (NBS - DES).

The ciphering chip 64 (FIG. 2B) has three separate ports; they are the auxiliary port (Aux Port) 66, the master port 68, and the slave port 70. The auxiliary port 66 is used to enter all master and working encryption/decryption keys. The master port 66 is used to enter working keys (under certain situations to be described later herein), commands, data, mode commands, and is also used to read data and statuses. The slave port 70 is normally used as an interface to another device; however, in the present invention, the slave port is used to return clear text keys back to the SRAM 60.

The ciphering chip 64 (chip 64) performs in the usual way except for those situations which will be differentiated hereinafter. The chip 64 includes the mode register 72, the mode status 74, the command register 76, the command status 78, the master key register 80, the encrypt register 82, the decrypt key register 84, the output register 86, the algorithm unit 88, the input register 90, the Initialization Vector (I.V.) encrypt register 92, and the I.V. decrypt register 94.

It would appear useful to give an illustration of how the ciphering chip 64 operates. In the simplest of situations, assume that an encryption/decryption (E/D)key is stored as clear text in the Ram 26 of the terminal 14. Suppose, also, that data supplied by the terminal 14 is to be encrypted by the E/D module 12. In this situation, the terminal 14, through its application program, will load the clear text key in the encrypt register 82 via the auxiliary port 66, and thereafter, the data to be encrypted is loaded into the input register 90 via the master port 68. The ciphering chip 64 then takes the E/D clear text key from the encrypt register 82 and the data from the input register 90 and encrypts the data in the algorithm unit 88. The encrypted data is then transferred to the output register 86 from where it is transferred to the terminal 14 when requested by that terminal. In the embodiment described, the terminal 14 may include a personal computer as the operating platform, for example, and accordingly, the transference of data between the host CPU 16 and the E/D module 12 may be handled as I/O writes or commands.

A feature of this invention is that it permits the user to select a particular level of security desired. In the embodiment described, there are three levels of security obtainable; they are:
1. Encryptor only,
2. Secure key storage, and
3. Secure key encrypting operations.

With the first level of security, only the encrypter or ciphering chip 64 is used. This level has already been described in relation to the illustration given for describing the simplest use of the ciphering chip 64. At this level, it is up to the user of the system to provide his or her own level of security.

The second level of security permits the E/D and master keys to be stored in the SRAM 60 for future use. As stated earlier herein, once the keys are written into the SRAM 60, the keys are prevented from unauthorized viewing or accessing.

The third level of security permits the process of decrypting one key with another key. The second and third levels of security will be more readily understood in relation to a discussion of the organization of the SRAM 60 and other aspects of the system 10.

Figures 3, 4:
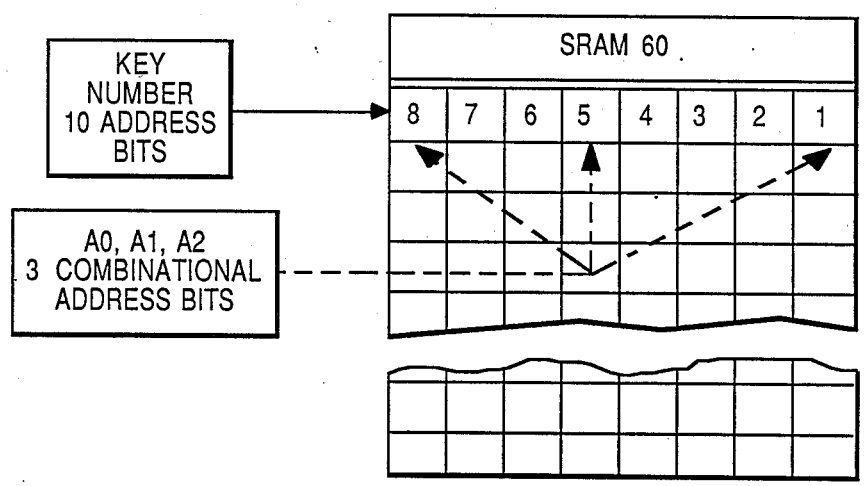
FIG. 3 shows the organization of the static RAM or SRAM shown in FIG. 2A.
FIG. 4 shows how the address bits are used to access particular bytes of data from the SRAM.

The different areas of the SRAM 60 along with their associated hex addresses are shown in FIG. 3. The areas comprise the master key area 60-1, the working key area 60-2, and the Initialization Vectors (I.V.s) or general purpose area 60-3. In the embodiment described, the master key area 60-1 is comprised of 32 blocks of data, with each block of data including eight bytes. Each block may contain a key which is eight bytes long. Each byte of the key contains a parity bit, so in reality, each master key is 56 bits long, with eight parity bits being included for the eight bytes of data associated with a master key. Naturally, other key lengths could be provided, depending upon a particular application. The working key area 60-2 contains 96 blocks of data. Correspondingly, this area 60-2 can store 96 keys which are organized as already described. And finally, the area 60-3 can store 896 blocks of data, with each block containing eight bytes.

When the host CPU 16 addresses the SRAM 60, the associated software puts out a key number which is placed in a key number latch 96 (FIG. 2A) via the bus 38 and an internal or secure bus 98 which is located on the E/D module 12. A system interface 100 (to be later described herein) is used to couple and uncouple the secure bus from the system bus 38 as alluded to earlier herein. The key number latch 96 is coupled to the local bus 38-1 (FIG. 2A). The latch 96 is comprised of one eight bit latch and a two bit latch (not shown), with eight bits of the address being placed in the eight bit latch and with the remaining highest two bits being stored in the two bit latch.

The key number being described contains ten bits of the 13 bits which are required to access a byte from the SRAM 60. Notice from FIG. 4 that the key number (10 address bits) points to a particular block in the SRAM 60. Notice, also, that the last three bits of the 13 bit address are combinational bits which are outputted by the terminal 14 and which are marked as A0, A1, and A2 in FIG. 4. These combinational bits A0, A1, and A2 may be considered as outputs of a binary counter to obtain eight different outputs to thereby select one of the particular eight bytes of data within a block in the SRAM 60.

The SRAM 60 has a conventional control marked as SRAM control 102 in FIG. 2A. The SRAM control 102 has the usual select (Ram Sel), read (RAM read), and write (RAM write) inputs supplied to it via the bus 98-1 in addition to the combinational bits A0, A1, and A2 already discussed. Once data is put into the SRAM 60, it remains there even though power is shut off due to the back up support by battery 62. When a particular key is to be withdrawn from the SRAM 60 and sent to the ciphering chip 64, it is done so in eight separate cycles, with one eight bit byte being sent in each one of the cycles.

It appears useful to provide some additional details about the particular ciphering chip 64 used. When using the AMD 9568 chip 64 mentioned, there's a special aspect of the chip 64 with regard to handling data going to and from the chip during read and write operations. During an I/O write from the host CPU 16, two cycles of operations are involved. During the first cycle, the host CPU 16 places the address for the particular element being addressed on the bus 98, and during the second half of the cycle, the data to be transferred is placed on the bus 98.

Figure 5:
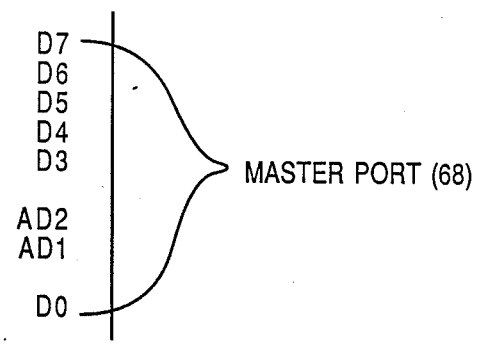
FIG. 5 is a diagram showing how certain data is transferred to the master port of the ciphering chip shown in FIG. 2B.
Figure 6:
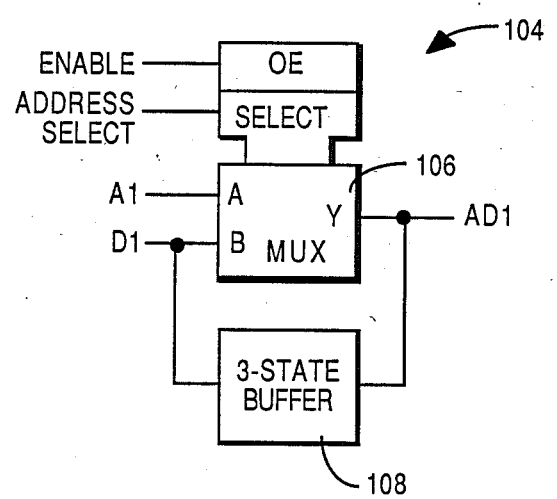
FIG. 6 is a schematic diagram showing some additional details of the address and bi-directional multiplexer shown in FIG. 2A.

The E/D module 12 has an address and bidirectional data multiplexer circuit (Mux circuit 104) which is shown generally in FIG. 2A and specifically in FIG. 6. The Mux circuit 104 is used when addressing the master port 68. This special aspect mentioned relates to the fact that there are six data lines D7–D3 and D0 on bus 98-3 going into the master port 68, while there are eight data lines D7–D0 in the bus 98-2 going to the auxiliary port 66, and eight data lines D7–D0 coming from the slave port 70 to the SRAM 60 on bus 98-4. The six data lines D7–D3 and D0 are used for data only, and consequently, the lines AD2 and AD1 coming from the Mux circuit 104 are used for providing address lines during the first half of the cycle mentioned, and the AD2 and AD1 lines are used for transferring data during the second half of the cycle mentioned. The various inputs to the master port 68 are shown in FIG. 5, with the lines AD2 and AD1 being the ones which are used for both address and data, values.

FIG. 6 shows more details of the Mux circuit 104 shown in block form in FIG. 2A, and this circuit 104 includes a conventional multiplexer 106. The multiplexer 106 has a conventional Enable input, address select, A1 (Address), and D1 (Data) bits. The first address bit A1 and the first data bit D1 are shown as combined bit AD1 in FIG. 5. When the address is selected on the first portion of the bus cycle mentioned, the input A1 is selected for transference to the master port 68. When the data is to be transferred on the second portion of the cycle, the data bit D1 is selected. There is an additional multiplexing element (not shown) to handle the multiplexing of the second address bit A2 and the second data bit D2 which are shown as combined bit AD2 in FIG. 5. The Mux circuit 104 also includes a three state buffer 108 which is used to transfer data around the multiplexer 106 to the bus 98 for transference back to the host CPU 16 during a read operation. Another latch (not shown) but similar to 3 state buffer 108 is used to transfer the second data bit D2 around the associated multiplexer circuit (not shown) to the bus 98 where these two data bits D1 and D2 are combined with the data bits D7-D3 and D0 for transference back to the host CPU 16.

FIG. 7 is a chart showing the states of the A2 and A1 inputs to the Mux circuit 104, shown in FIG. 2A, for the various registers and read/write conditions shown. For example, when the inputs A2 and A1 are at 0, the data or input register 90 is selected for a read/write operation.

Some additional points about the enciphering chip 64 require some additional explanation. In this regard, the master key register 80 always stores clear text.

The mode register 72 is used to tell the enciphering chip 64 how it is to perform; it decides whether the data is to be encrypted or decrypted. The mode register 72 also decides three separate modes or situations; they are:

1. Whether data to be encrypted or decrypted will enter the chip 64 through the master port 68 and exit through the master port 68.

2. Whether encrypted data will enter through the master port 68 and exit through the slave port 70; and 3. Whether clear text data will come in the master port 68 and exit through the slave port 70. The particular enciphering chip 64 selected supports a fourth mode of operation; however, it is not important for an understanding of this invention.

The mode status register 74 is used to inform the host CPU 16 as to the status of the enciphering chip 64.

The command register 76 tells the enciphering chip 16 what function it is to perform.

The command status register 78 is used to inform the host CPU 16 as to whether or not a command was performed as requested.

Some additional points about the use of the enciphering chip 64 (FIG. 2B) should be mentioned at this time; they are:

1. As used herein, the master port 68 is usually used to transfer data to and from the host CPU 16.

2. The slave port 70 is utilized at the highest level of security or the level three mentioned earlier herein. This occurs when hardware including the system interface 100 (to be described) associated with the E/D module 12 detects that a master key has been taken from the master key area 60-1 of the SRAM 60 and put into the decrypt register 84 via the Aux port 66. The system interface 100 mentioned disables the secure bus 98 from the main bus 38 so that data present in output register 86 of the chip 64 can no longer pass through the master port 68 to the host CPU 16; however, the host CPU 16 can write commands to the chip 64. In effect, the system interface 100 disables the read signal to the master port 68, but the host CPU 16 can still write to the mode register 72, for example, and check on various statuses. The key data in the output register 86 is outputted only to the master area 60-1 via the slave port 70; this is accomplished by a write instruction from the host CPU As an aside, one of the features of the chip 64 selected for use in this invention is that once a key is written into the registers 80, 82, and 84, it cannot be extracted from the chip 64; however, to remove this data, it is simply written over by the next key coming into these registers. Once a new key is written into the registers 80, 82, or 84, the contents of the output register 86 are also destroyed.

Another characteristic of the chip 64 is that it permits the I.V. encrypt and decrypt registers 92 and 94 to be read by the host CPU 16; consequently, it should be considered as an unsecure part of the E/D module 12. The initialization vectors are stored in the area 60-3 of the SRAM 60. The same techniques of disabling the main bus 38 and transferring the initialization vectors to the SRAM 60 could be employed to provide security for the initialization vectors; however, the master port 68 instead of the slave port 70 would be used for this purpose.

Another feature of this invention is that it facilitates the decrypting of keys such as key encrypting key schemes. For example, once an encrypted key is decrypted, one would not want this clear text key to be read out of the E/D module 12; however, one would want to be able to read and write status commands from the host CPU 16 to the E/D module 12. The technique for doing this will be described in more detail hereinafter. In general, the system is set up to force the host CPU 16 to do an I/O write to transfer information either directly to the SRAM 60 or to force the information from the enciphering chip 64 back to the SRAM 60. By using I/O writes, no software debugger or no application software can ever see the data because the buffers and the like in the host CPU 16 are directed away from the host CPU 16, and consequently, there's no way the data can return to the host CPU 16. In other words, the SRAM 60 is treated as a write only port as far as the host CPU 16 is concerned, but data can be written from the enciphering chip 64 to the SRAM 60.

Still another feature of the invention is that the SRAM 60 is split or divided into two areas as far as the storing of keys is concerned. The master key area 60-1 permits the highest level of security to allow for "key encrypting key" schemes; this aspect will be discussed in more detail hereinafter. When one key is decrypted by another or second key, with the second key coming from area 60-1 of the SRAM 60, the result is placed in the output register 86 of the enciphering chip 64, for example. Any effort by the host CPU 16 to read the output register 86 through the master port 68 in the example being described, causes the secure bus 98 to be uncoupled from the main bus 38 as previously described.

It should be recalled that while one does not want the secure data or keys to be read back to the host CPU 16, the host CPU 16 still has to communicate with the E/D module 12 to obtain the status information as previously explained. As a general summary, the hardware including the system interface 100 will not let the host CPU 16 read the output register 86 through the master port 68 until:

1. A new decrypt key that is in clear text is presented to the decrypt key register 84 through the Aux port 66; and 2. The new decrypt key did not come from the master key area 60-1 of the SRAM 60.

3. All eight bytes of the new decrypt key are transferred with no parity errors.

Figure 8:
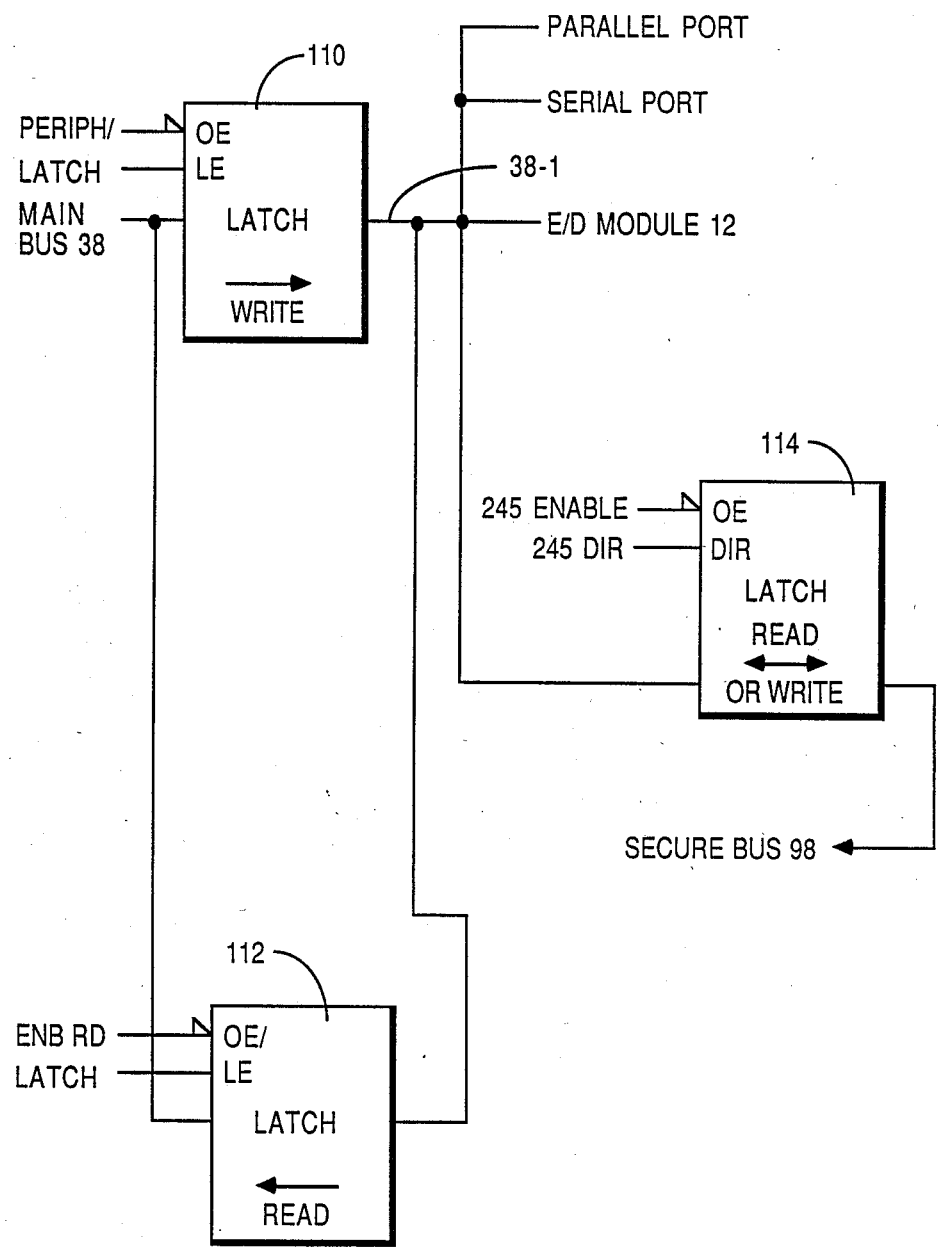
FIG. 8 is a schematic diagram of the system interface shown generally in FIG. 2A.

Having described the general method of operation of the enciphering chip 64, it appears useful to describe the general functioning of the system interface 100 shown in FIGS. 2A and 8. The system interface 100 includes the conventional one way latches such as circuit No. 74LS573 which are referenced as latches 110 and 112, and it also includes the two way latch 114 which is a conventional latch such as circuit No. 74LS245. All these latches mentioned are eight bits wide in the embodiment described.

As seen from FIG. 2A, the system interface 100 shown in FIG. 8 is controlled by five control signals; they are:
1. Latch,
2. Periph (Periphery),
3. Enable Read,
4. Enable 245, and
245 Direction.

The first three signals listed are used to control the one way latches 110 and 112, while the last two signals listed control the latch 114. The latches 110, 112, and 114 form the coupling between the main bus 38 and the secure bus 98. When the signal Latch is active or high and the signal Periph is active or low, data from the host CPU 16 is transferred from the main bus 38 to a local bus 38-1 on which the E/D module 12 and the parallel port and serial port are located. These two ports mentioned provide a coupling to other circuits not important to an understanding of this invention; however, they are shown to illustrate the versatility of the system 10. If the data coming from the host CPU 16 is to be transferred to the SRAM 60 or the encrypter chip 64, itself, the 245 Enb signal will become active or low, and the signal 245 Dir will switch to a state which indicates that the data s to be transferred to the secure bus 98. If the data were to be transferred to a register like the input data register 90, the data would pass through the latch 110. Upon the occurrence of an Encrypt WR (Write) signal coming from the timing and decode circuit 116 shown in FIG. 2A, the data is written into the input register 90. Near the end of a bus access cycle, as discussed earlier herein, the signal Latch will go low or inactive; in the process, the latch 110 will maintain the data at its output regardless of what happens at the input of the latch 110. This permits the host CPU 16 to put "garbage" on the input side of the latch 110 at the end of its bus access gate without affecting the data on the output side of the latch 110. This provides the necessary data hold times during a "write" to the encrypter chip 64 from the host CPU 16. When the bus access cycle is over, the signal Periph would be disabled, thus isolating the secure bus 98 from the main bus 38.

In order to perform a read operation by the host CPU 16, the signal Enable Read to latch 112 becomes valid for transferring data from the local bus 38-1 to the host CPU 16, and the signal Latch also becomes active or high. If data is to be read from the mode register 72 of the enciphering chip 64, for example, the signal 245 Enable would become active or low, and the signal 245 Direction would become valid for a read operation. It should be pointed out that reading the mode register 72 does not present security problems as far as the E/D keys are concerned, so this reading is permitted by the E/D module 12.

The special encrypter module conditions represented by decoder block 118 are used to discern whether or not certain conditions exist which require that the secure bus 98 be uncoupled from the main bus as discussed earlier herein. The conditions represented by decoder block 118 will be discussed hereinafter. Near the end of the bus access cycle, the signal Latch goes inactive to latch the data from the E/D module 12 into the latch 112 where it is maintained until the host CPU 16 is finished reading the data. Before the host CPU 16 is finished reading the data in the latch 112, the E/D module 12 would have ended its bus access cycle and gone into its idle state.

As stated earlier herein, one of the features of the third level of security made available by the E/D module 12 is that "key encrypting key schemes" are made possible. As an illustration, a bank official (at a secure site) might start out with three all clear text keys as shown in FIG. 9; they are a Master Key, Key #1 and Key #2. Using software associated with the host CPU 16, the official would put Key #1 into the encrypt register 82 of the enciphering chip 64 and put Key #2 into the input register 90 to enable Key #2 to be encrypted by Key #1, with the encrypted Key #2 appearing in the output register 86 of the chip 64 and becoming the Working Key shown in FIG. 10. A working key is defined as a key to encrypt or decrypt data. The working key may be installed in registers 82 or 84 as clear text in one situation. In another situation, the working key may be entered into the encrypter chip 64 in encrypted form and thereafter it is decrypted by the associated master key which is installed in register 80. The working key which is now in clear text, may then be installed in the registers 82 or 84 for use in encryption or decryption, respectively. This Working Key of FIG. 10 has the address in the SRAM 60 shown. This same process can be repeated using the Master Key to encrypt Key #1. To repeat the procedure, the clear text Master Key is placed in the encrypt key register 82, the clear text Key #1 is placed in the input register 90, and the algorithm unit 88 in conjunction with the Master Key will generate Key #1 which has been encrypted with the Master Key and place it in the output register 86. Thereafter Key #1 encrypted with the Master Key will be placed in the memory location shown in FIG. 10. At this point in the explanation, the two keys which have been encrypted can be used by the system 10. The software associated with the host CPU 16 can select these keys for an encryption/decryption operation.

One of the features of the system 10 is that the two encrypted keys which were generated as described in the previous paragraph can be placed over external communication lines without fear of compromise. The Working Key and Key #1 encrypted with Master Key shown in FIG. 10 may be stored in the host CPU 16. An unauthorized user would not gain access to the system 10 because he does not have access to the Master Key, for example.

One of the simplest ways of using the system 10 is to take one of the encrypted keys which may be stored in the host CPU 16 and use it to encrypt or decrypt data. To repeat, the application program in the host CPU 16 would know where the particular keys to be used are stored. Assume that Key #1 encrypted with Master Key will be used by the host CPU 16. The host CPU 16 will send instructions to the E/D module 12 to place the Master Key from area 60-1 of the SRAM 60 into the decrypt register 84. As soon as the first byte of the master key is moved to the auxiliary port 66, the secure bus will be uncoupled from the main bus a previously described. Thereafter, the host CPU 16 would instruct the E/D module 12 that the Key #1 encrypted with Master Key is to be loaded in the input register 90 of the enciphering chip 64. The algorithm unit 88 then generates the clear text Key #1 which is placed in the output register 86. This clear text Key #1 is then routed out the slave port 70 to the master key area at address 010, for example, of the SRAM 60. Thereafter, the software associated with the host CPU 16 would withdraw the clear text Key #1 and place it in the master key register 80 via the Aux port 66 for use in decrypting the new working key (FIG. 10). The encrypted working key would then be installed in the encrypter key register 82 and/or the decrypt key register 84 by the command to load an encrypted E or D key through the auxiliary port 66. Note that before the D key is loaded, the main bus 38 must be reenabled or coupled by the loading of a clear text key into the decrypt key register 84 through the auxiliary port 66. This key cannot come from the master key area 60-1 of the SRAM 60. Also note that this working key would be stored in location 035 in the SRAM 60 in its encrypted form. The data to be encrypted would then be placed in the input register 90 for encryption. The encrypted data would then freely pass out the output register 86 to the host CPU 16. A point to notice here, is that when a master key is used to decrypt an encrypted key which is not a working key, the clear text result always goes out the slave port 70 to a designated area of the SRAM 60, and when a clear text master key is used to decrypt a working key, the working key goes into one of the two registers 82 or 84 of the enciphering chip 64. There may be several levels of encryption and decryption of keys as shown by Key A and Key #1 shown in FIG. 10. A general rule to apply when using encrypted keys is that one always needs the clear text key immediately prior to the working key that one intends to use. Using the example given (assuming Key A is not in FIG. 10), because the Key #1 was to be the working key, the clear text Master Key was selected to be placed in the master key register 80 for decrypting the Key #1 encrypted with Master Key.

The means for determining when the secure bus is to be unlocked from the main bus can best be described in relation to FIGS. 2A and 2B. The decoder block 118 may contain conventional combinational logic or Programmable Array Logic (PAL) for combining certain input signals to obtain the required output signals to effect the unlocking and locking of the secure bus 98. The input signals include the following:
1. AFLAG,
2. PARITY,
3. MASTER KEY,
4. KEY SOURCE,
5. ANY D, and
6. CLEAR D AUX.

The AFLAG signal comes from the enciphering chip 64. Its general function is to indicate (when low) that the next byte of data coming from a source is able to be transferred to the auxiliary port of the enciphering chip 64.

The PARITY signal also comes from the enciphering chip 64. When the PARITY signal from the enciphering chip 4 is a low level, it indicates that there was an error in a particular byte of a key being transferred to the chip 64. It should be recalled that each one of the eight bytes included in a key, for example, has a parity bit. The eight bytes of data which are loaded into the auxiliary port of the chip 64 cannot have a parity error in them, and also, the AFLAG signal must be active or low during the entire time of the transfer.

The MASTER KEY signal is a status byte which indicates the source of the particular key being transferred. MASTER KEY is a signal which is generated by looking at the value which is loaded into the key number latch 96 (FIG. 2A). The upper five bits are looked at, and, if they are all zero, they indicate that the key is being accessed from the master key area 60-1 of the SRAM 60.

The KEY SOURCE signal is a bit which indicates whether the source of the key is from the host CPU 16 or from the SRAM 60; basically, this signal is decoded from the addresses.

The ANY D signal is a signal which goes active any time a load decrypt key command is given to the encrypter chip. There are four different types of decrypt commands which may be given; they are:
1. Load clear decrypt key through the auxiliary port 66.
2. Load clear decrypt key through the master port 68.
3. Load encrypted decrypt key through the auxiliary port 66.
4. Load encrypted decrypt key through the master port 68.

The CLEAR D AUX signal is used to indicate that a command has been given to load a clear text decrypt key through the auxiliary port 66 of the enciphering chip 64.

To lock the secure bus 98 from the main bus 38 or to "uncouple" it therefrom, the ANY D and MASTER KEY signals must be active while the KEY SOURCE signal indicates SRAM as the source. In other words, the enciphering chip 64 has been instructed to load a key from the master key area 60-1 into the decrypt key register 84 via the auxiliary port 66.

To unlock the secure bus 98 or to "couple" it to the main bus 38, the CLEAR D AUX signal must be active while the MASTER KEY signal must be inactive. In other words, the secure bus 98 becomes coupled to the main bus by destroying the contents of the decrypt key register within the enciphering chip 64. This can be done by:
1. Selecting and writing a clear text key from the working area 60-2 of the SRAM 60 through the auxiliary port 66 into the decrypt key register 84 of the enciphering chip 64; or
2. Writing a clear text key from the host CPU 16 into the decrypt key register 84 via the auxiliary port 66 of the enciphering chip 64.

As an aside, it should be recalled that a 56 bit key being utilized in this invention is loaded into the enciphering chip 64 as a series of eight bytes of data, with one bit in each byte being a parity bit. In effect, the AFLAG and PARITY signals coming from the enciphering chip 64 are used to monitor the progress of the key being entered into the chip 64. In other words, during the loading of the eight bytes of the key into the chip 64, there cannot be any parity error, and the AFLAG signal must be active for the entire time of entering the key. By using the AFLAG and PARITY signals, an effort is made to prevent a debugger from trying to unlock the secure bus 98 without actually having destroyed the contents of the decrypt key register 84. Again, by checking on the parity of the key being entered on a per byte basis, an effort is made to make sure that the new key being entered actually destroys the original secure key which was entered into the decrypt key register 84.

Another point worth mentioning with regard to the particular enciphering chip 64 selected for use with this invention is that the AMD 9568 chip has a special reset feature. If the chip receives a second command before the first command is completed, the second command is viewed as a reset which clears the chip entirely. When the chip is in reset state, the AFLAG signal is inactive, and therefore, the secure bus 98 will not unlock or be coupled to the main bus 38. The AFLAG signal is active only when there is a valid command to the enciphering chip 64.

Again, it should be stated that when the secure bus 98 is uncoupled from the main bus 38 as described herein, the only function that is really disabled is the reading of the output register 86 of the enciphering chip 64 by the host CPU 16. The host CPU 16 is still able to read mode and status registers, like 72 and 74, as previously described.

Some additional circuitry included in the means for uncoupling the secure bus 98 from the main bus 38 is represented by the timing and decode circuit 118 hereinafter referred to as circuit 116. The signals associated with the circuit 116 along with a brief description of them are as follows:

1. RAM WRITE - This signal controls the writing of data into the SRAM 60 (FIG. 2A).
2. RAM READ - This signal controls the reading of data from the SRAM 60.
3. ENCRYPT CLK - This clock provides the clock to the enciphering chip 64.
4. MALE - This signal is the master port address latch enable, and it is used to latch the addresses into a latch (not shown) within the enciphering chip 64 during the first half of the bus access cycle.
5. ENCRYPT WR - This signal, when active, is used to write data into the master port 68.
6. ECRYPT RD - This signal, when active, is used to read data from the master port 68.
7. LOAD KEY - This signal, when active, is used to strobe or write data into the auxiliary port 66. There is no "read" signal for the auxiliary port 66 because of the way the enciphering chip 64 is designed.
8. SLAVE RD - This signal, when active, is used to read the slave port 70.

Figure 11:
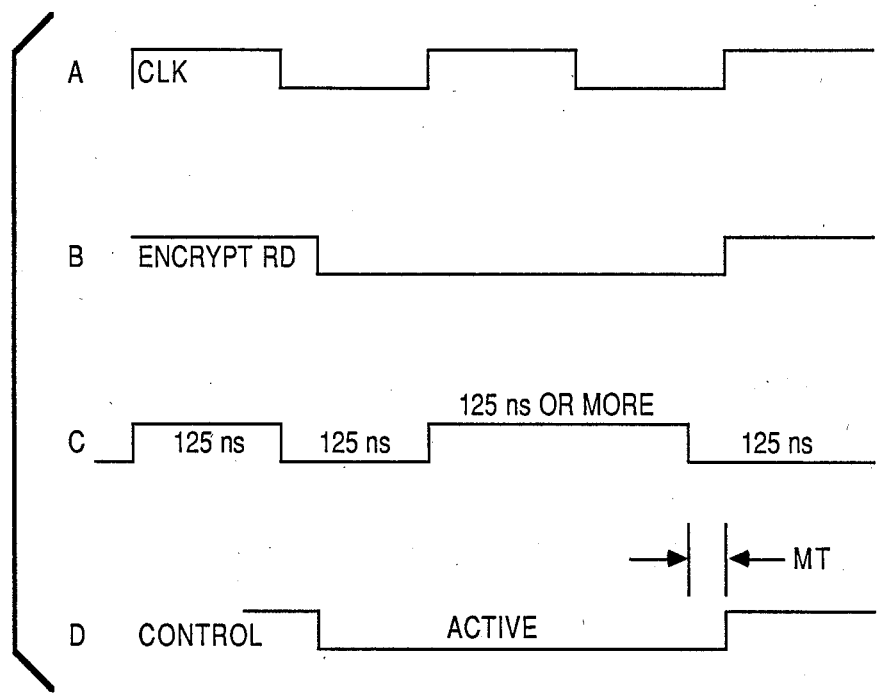
FIG. 11 is a timing diagram showing certain timing relationships associated with the enciphering chip shown in FIG. 2 B.

Because the enciphering chip 64 selected is a conventional chip, conventional logic circuitry may be employed in the circuit 116 (FIG. 2A) to provide the appropriate timing relationships. There is one area, however, which should be mentioned. This area relates to the clock supplied to the enciphering chip, with the clock being shown in FIG. 11. As far as the clock is concerned, there are certain minimums placed upon the active and inactive portions of the clock as shown by waveform A. In order to satisfy some of the requirements of the control signals, it was necessary to prolong, slightly, the high level portion of the clock as shown in waveform C. In the embodiment described, the high level portion of the waveform C was prolonged in multiples of 62.5 nanoseconds (ns).

Extending the high level portion of the clock shown in waveform C was effected so that the rise of the control signal occurs at a predetermined time after the fall of the clock shown in waveform C. The maximum time between the fall in waveform C and the rise in waveform D is shown by double arrow MT. This maximum time MT for the enciphering chip 64 selected for use with this invention is 40 nanoseconds for the master port 68 accesses, and 60 nanoseconds for the auxiliary port 66 and the slave port 70 accesses.

What is claimed is:

1. A system for providing secure key management and storage comprising:
    a host terminal including a processor for executing instructions;
    an encryption module for encrypting/decrypting data; and
    a first bus for coupling said encryption module with said host terminal;
    said encryption module comprising:
    a data ciphering chip for encrypting/decrypting data;
    storing means including a static RAM for storing at least a key therein;
    a second bus for directly coupling said storing means with said data ciphering chip for transferring key to said ciphering chip for use thereby and for transferring said key back to said static RAM;
    interface means for coupling said second bus with said first bus;
    said processor being effective to install said key in said static RAM of said storing means; and
    said interface means having means for uncoupling said second bus from said first bus with regard to accessing said key whenever said key is to appear on said second bus after being installed in said storing means by said processor so as to effectively make said RAM a hardware extension of said data ciphering chip and so as to make said key unavailable to said host terminal for reading said key.

2. A system for providing secure key management and storage comprising:
    a host terminal including a processor for executing instructions;
    an encryption module for encrypting/decrypting data and keys such as key encrypting key schemes; and
    a first bus for coupling said encryption module with said host terminal;
    said encryption module comprising:
    a data ciphering chip for encrypting/decrypting data and keys such as key encrypting key schemes;
    storing means including a battery support static RAM for storing at least a master key therein;
    a second bus for directly coupling said storing means with said data ciphering chip for transferring said master key to said ciphering chip for use thereby;
    interface means for coupling said second bus with said first bus;
    said processor being effective to install said master key in said static RAM of said storing means;
    said interface means including:
    determining means for determining whenever said master key is to appear on said second bus; and
    disconnecting means for disconnecting said second bus from said first bus with regard to accessing said master key whenever said master key is to appear on said second bus after being installed in said storing means by said processor so as to effectively make said RAM a hardware extension of said data ciphering chip and so as to make said master key unavailable to said host terminal for reading said master key.

3. A system for providing secure key management and storage comprising:
    a host system including a processor for executing instructions;
    an encryption module for encrypting/decrypting data and encryption keys;
    said encryption module comprising:
    an enciphering chip having a decrypt key register and a port for entering data therein;
    a static RAM having a first area for storing master keys, a second area for storing working keys, and a third area for storing general purpose data;

an interface means for controlling the flow of data on said encryption module; and a bus directly coupling said port of said enciphering chip with said static RAM and said interface means; and said system also including a system bus coupling said processor with said interface means;

said processor being effective to install said master keys in said first area; and said interface means being effective after said processor installs said master keys in said first area to disconnect said second bus from said first bus with regard to accessing said master keys whenever one of said master keys is withdrawn from said first area and transferred to said decrypt key register via said port so as to effectively make said static RAM a write only RAM as far as said processor is concerned and so as to make said master and working keys unavailable to said processor for reading.

4. The system as claimed in claim 3 in which enciphering chip is chip AMD 9568, and said port is the auxiliary port of said enciphering chip.

5. A method of keeping encryption keys secure for use with an enciphering chip, comprising the steps of:
  (a) providing a storing means including a static RAM for storing at least one key to be used in conjunction with said enciphering chip;
  (b) utilizing an instruction from a processor to write said key into a predetermined area of said RAM of said storing means;
  (c) providing a first bus for directly coupling the storing means with the enciphering chip;
  (d) providing a system interface between said first bus and said processor;
  (e) utilizing an instruction from said processor to transfer said key from said predetermined area of said storing means to said enciphering chip;
  (f) utilizing said system interface to lock said bus from said processor with regard to accessing said key after step b has occurred so as to effectively make said RAM a hardware extension of said data ciphering chip and so as to make said key unavailable to said host terminal for reading said key.

6. The method as claimed in claim 5 in which said utilizing steps b and e are effected by utilizing an I/O instruction.

7. A method of keeping encryption keys secure for use with a processor and an enciphering chip when using key encrypting key schemes; said key encrypting key schemes comprising at least a clear text master key, an encrypted intermediate key, and an encrypted working key which are related to one another; said method comprising the steps of:
  (a) providing a storing means including a static RAM having a first area for storing said clear text master key and also having a second area for storing said encrypted intermediate and working keys;
  (b) providing a first bus for directly coupling said storing means with said enciphering chip;
  (c) providing a system interface between said first bus and said processor;
  (d) transferring said clear text master key from said first area over said first bus to said enciphering chip with instructions to decrypt data;
  (e) transferring said encrypted intermediate key to be used to said encryption chip for decryption by said enciphering chip; said encrypted intermediate key being previously encrypted by said clear text key master key;
  (f) decrypting said encrypted intermediate key from step e to generate a clear text intermediate key;
  (g) transferring said clear text intermediate key from step f over said first bus to said first area of said storing means;
  (h) transferring said clear text intermediate key from said first area of said storing means over said first bus to a master key register of said enciphering chip;
  (i) installing said encrypted working key in at least one of the encrypt and decrypt register of said enciphering chip;
  (j) utilizing said encrypted working key installed in step i for encryption/decryption operations by said processor; and
  (k) utilizing said system interface to uncouple said first bus from said processor whenever a clear text key appear on said first bus so as to effectively make said RAM a hardware extension of said data ciphering chip and so as to make said key unavailable to said host terminal for reading said key.

* * * * *

UNITED STATES PATENT AND TRADEMARK OFFICE
CERTIFICATE OF CORRECTION

PATENT NO. : 4,888,802

DATED : December 19, 1989

INVENTOR(S) : Henry G. Cooney

It is certified that error appears in the above-identified patent and that said Letters Patent is hereby corrected as shown below:

Column 14, line 8, after "transferring" insert --said--.

Column 14, line 35, delete "support" and substitute --supported--.

Column 16, line 44, delete "appear" and substitute --appears--.

Signed and Sealed this

Sixteenth Day of October, 1990

Attest:

HARRY F. MANBECK, JR.

*Attesting Officer*  *Commissioner of Patents and Trademarks*